US012785492B2

(12) United States Patent

Anton et al.

(10) Patent No.: US 12,785,492 B2
(45) Date of Patent: Nov. 3, 2026

(54) MOTOR DEVICE FOR AN ELECTRIC BICYCLE

(71) Applicant: Mahle International GmbH, Stuttgart (DE)

(72) Inventors: Ivan Anton, Valladolid (ES); Marco Antonio De La Serna Gonzalez, Palencia (ES); Jose Vicente Franco Revilla, Palencia (ES); Gonzalo Garcia Sanchez, Cordova (ES); Carlos Gonzalez De Juan, Valladolid (ES); Jaume Jumbert, Juneda (ES); Sergio Perez, Alicante (ES)

(73) Assignee: MAHLE International GmbH (DE)

( * ) Notice: Subject to any disclaimer, the term of this patent is extended or adjusted under 35 U.S.C. 154(b) by 924 days.

(21) Appl. No.: 17/945,986

(22) Filed: Sep. 15, 2022

(65) Prior Publication Data

US 2023/0082259 A1 Mar. 16, 2023

(30) Foreign Application Priority Data

Sep. 16, 2021 (EP) .................................... 21197079

(51) Int. Cl.
*H02K 5/22* (2006.01)
*B62M 6/55* (2010.01)
*H01R 13/631* (2006.01)

(52) U.S. Cl.
CPC ............... *H02K 5/225* (2013.01); *B62M 6/55* (2013.01); *H01R 13/631* (2013.01); *H01R 2201/10* (2013.01)

(58) Field of Classification Search
CPC ... B60B 27/023; B60B 27/026; B60B 35/006; B62K 25/02; B62K 2206/00; B62M 6/65; H02K 5/22; H01R 13/631; H01R 2201/10
(Continued)

(56) References Cited

U.S. PATENT DOCUMENTS

| | | | | |
|---|---|---|---|---|
| 2002/0098933 | A1* | 7/2002 | Kline | B62M 9/16 474/116 |
| 2010/0301711 | A1* | 12/2010 | Ando | H02K 7/1846 310/67 A |
| 2023/0049132 | A1* | 2/2023 | Van Druten | B62M 9/125 |

FOREIGN PATENT DOCUMENTS

| | | | |
|---|---|---|---|
| CN | 207078277 U | * | 3/2018 |
| FR | 3083205 B1 | | 12/2020 |

(Continued)

OTHER PUBLICATIONS

English Abstract for JP-2001071983-A (Year: 2001).*
English abstract for JP-2001071983.

*Primary Examiner* — Valentin Neacsu
*Assistant Examiner* — Tyler Jay Stanley
(74) *Attorney, Agent, or Firm* — Fishman Stewart PLLC

(57) ABSTRACT

A motor device for an electric bicycle may include an electric motor, a first connector unit, and/or a second connector unit. The electric motor may include an axis of rotation. The first connector unit may include a first motor connector and a first connecting part. The first connecting part may surround the first motor connector regionally and/or outwardly. The first connector unit may be mounted on the electric motor and may be electrically conductively connected to the electric motor via the first motor connector. The second connector unit may include a second motor connector and a second connecting part. An electrical conductive connection may be established and released directly between the first motor connector and the second motor connector.

13 Claims, 6 Drawing Sheets

(58) Field of Classification Search
USPC ........................ 180/65.51, 206.5, 206.6, 220
See application file for complete search history.

(56) References Cited

FOREIGN PATENT DOCUMENTS

| | | | |
|---|---|---|---|
| JP | 2001071983 | A | 3/2001 |
| WO | 2009027683 | A1 | 3/2009 |
| WO | 2010091524 | A1 | 8/2010 |
| WO | 2011111299 | A1 | 9/2011 |

* cited by examiner

MOTOR DEVICE FOR AN ELECTRIC BICYCLE

CROSS-REFERENCE TO RELATED APPLICATION

This application claims priority to European Patent Application No. EP21197079.3 filed Sep. 16, 2021, the contents of which is hereby incorporated by reference in its entirety.

TECHNICAL FIELD

The invention relates to a motor device for an electric bicycle. The invention further relates to a connector unit for the motor device and an electric bicycle with the motor device.

BACKGROUND

An electric bicycle is known, for example, from JP 2001071983 A and WO 2009027683 A1. The electric bicycle typically contains an electric motor and a battery. The battery and the electric motor are electrically connected to each other via a connector unit, wherein the connector unit usually comprises a connector on the battery side and a connector on the electric motor side. The connector on the battery side is connected to the battery and the connector on the electric motor side is connected to the electric motor each via a cable. When mounting or dismounting a rear wheel of the electric bicycle carrying the electric motor, the connection between the battery and the electric motor have always to be established or released. As a result, mounting or dismounting the rear wheel takes a long time. Moreover, if the connector unit is not loosened when removing the rear wheel, the connector unit can be damaged. Furthermore, the connector must be positioned on the bicycle in such a way that it is always accessible for connecting the battery and the electric motor.

It is therefore the object of the invention to provide an improved or at least alternative embodiment for an electric bicycle of the generic type, a motor device for the electric bicycle and a connector unit for the motor device, in which the described disadvantages are overcome.

SUMMARY

A motor device is provided for an electric bicycle. The motor device contains an electric motor having a rotation axis and a connector unit. The motor device further contains a first connector unit and a second connector unit. The first connector unit contains a first motor connector and a first connecting part that surrounds the first motor connector regionally and outwardly. The first connector unit is mounted on the electric motor and is electrically conductively connected to the electric motor via the first motor connector. The second connector unit comprises a second motor connector and a second connecting part. An electrical conductive connection can be established and released directly between the first motor connector and the second motor connector. According to the invention, a form-fitted connection can be established and released between the first connecting part and the second connecting part transversely to the axis of rotation. When establishing and releasing the form-fitted connection between the connecting parts, the electrical conductive connection between the motor connectors can also be established and released.

In the present invention, the terms "axial" and "radial" always refer to the axis of rotation of the electric motor.

Advantageously, the first connector unit can be fixedly mounted i.e., rigidly fixed to the electric motor. The electric motor can contain a stator and a rotor and the first connector unit can then be fixedly mounted i.e., rigidly fixed to the stator of the electric motor. The first motor connector and/or the first connecting part can be fixedly mounted i.e., rigidly fixed to the electric motor and/or to each other. The second motor connector and/or the second connecting part can be fixedly mounted i.e., rigidly fixed to each other in the second connector unit. Advantageously, the second connector unit can be designed to be fixedly mounted i.e., rigidly fixed to a dropout of the electric bicycle preferably via a carrier and the electric motor can be designed to be fixedly mounted i.e., rigidly fixed to a rear wheel of the electric bicycle. The first motor connector of the first connector unit mounted on the electric motor and the second motor connector of the second connector unit can be arranged in such a way that, if the rear wheel is positioned on the dropout for mounting a thru axle of the rear wheel, the form-fitted and electrical conductive connection between the first connector unit mounted on the electric motor and the second connector unit is established. There, the two motor connectors are directly connected to each other in an electrical conductive manner. In other words, the two motor connectors are plugged into each other and thereby electrically connected with each other. For this purpose, the two motor connectors are suitably formed to correspond with one another i.e., to be complementary to one another i.e., to be plugged into one another. Thus, when the rear wheel is positioned for mounting the thru axle, the form-fitted and electrical conductive connection between the first connector unit mounted to the electric motor and the second connector unit can be automatically established. This can reduce the time required to mount and dismount the rear wheel of the electric bicycle. In addition, the risk of damage of the second connector unit can be reduced.

Advantageously, the motor device can comprise a form-fitting unit having a first form-fitting element and having a second form-fitting element. The first form-fitting element can be formed on the first connecting part, and the second form-fitting element can be formed on the second connecting part. Furthermore, the first or second form-fitting element can be insertable into the second or first form-fitting element transversely to the axis of rotation and thereby the form-fitted connection between the connecting parts can be established. As a result, the first connecting part can be guided transversely to the axis of rotation on the second connecting part or vice versa in a simplified manner, thereby simplifying the establishing and releasing of the electrical conductive connection between the first connector unit mounted on the electric motor and the second connector unit. The form-fitted connection acts parallel to the axis of rotation of the electric motor, so that the two connecting parts cannot be detached axially from each other.

The first form-fitting element can be formed by two first guide rails spaced apart from one another and aligned transversely to the axis of rotation, and the second form-fitting element can be formed by two second guide rails spaced apart from one another and aligned transversely to the axis of rotation. The first guide rails and the second guide rails can be formed complementary to each other. Furthermore, the first guide rails and the second guide rails can be displaceable into one another transversely to the axis of rotation and fixedly connectable to one another parallel to the axis of rotation. In addition, the two first guide rails and the two second guide rails can each be aligned non-parallel to each other and approach each other radially inwardly towards the axis of rotation. In this embodiment of the form-fitting unit, the first connecting part can be guided on the second connecting part or vice versa in a particularly secure and simplified manner.

In an advantageous embodiment, it can be provided that the second connector unit contains a carrier. The carrier surrounds the second connecting part and the second motor connector at least in regions towards the electric motor. Thus, the carrier can protect the second connecting part and the second motor connector from the outside. Advantageously, the carrier can be fixedly connected i.e., rigidly fixed to the electric bicycle or can be integrated into the electric bicycle or can be integral with or can be formed from the same piece of material with a dropout of the electric bicycle. The second connecting part can be formed on the carrier or can be fixed to the carrier in a form-fitted and/or force-fitted and/or material-bonded manner. In addition, the second motor connector can be fixedly connected i.e., rigidly fixed to the carrier in a form-fitted and/or force-fitted and/or material-bonded manner.

In an advantageous embodiment of the motor device, the motor device can include a thru axle. In this case, the thru axle defines the axis of rotation of the electric motor and extends through the electric motor and the second connector unit. It will be understood that the thru axle also extends through a dropout of the electric bicycle, thereby securing the rear wheel carrying the electric motor to the dropout. In addition, the thru axle can also fix the first connector unit mounted on the electric motor and the second connector unit to each other transversely to the axis of rotation so that the form-fitted connection between the connecting parts and the electrical conductive connection between the motor connectors are non-detachable, when the thru axle is mounted in the rear wheel and the dropout i.e., when the rear wheel is mounted on the dropout. In individual components of the second connector unit—for example in the carrier and/or in the second connecting part—and of the first connector unit mounted on the electric motor—for example in the second connecting part,—axially corresponding openings for the thru axle can be formed.

The second connector unit can further comprise a second battery connector for connecting the second connector unit to a first battery connector of a battery of the electric bicycle. The first battery connector can thereby be electrically conductively connected to the second motor connector via a cable. The two battery connectors are formed to correspond with each other i.e., to be plugged into each other. Via the first connector unit and second connector unit, the battery can be electrically conductively connected to the electric motor.

The invention also relates to a connector unit arrangement for the motor device described above and having the first connector unit and the second connector unit. The connector unit arrangement is formed in such a way that a form-fitted connection can be established and released between the second connector unit and the first connector unit for the electric motor transversely to the axis of rotation. When establishing and releasing the form-fitted connection, an electrical conductive connection can be established and released between the second connector unit and the first connector unit for the electric motor. The first connector unit can thereby be provided for fixed connection i.e., rigid fixing to the electric motor. The second connector unit can thereby be provided for fixed connection i.e., rigid fixing to the electric bicycle, in particular to a dropout of the electric bicycle, in particular to a dropout of the electric bicycle via a carrier. In order to avoid repetition, reference is made at this point to the above explanations.

The invention also relates to an electric bicycle. Here, the electric bicycle contains a motor device described above and having the electric motor, the first connector unit, and the second connector unit. In addition, the electric bicycle contains a rear wheel, a dropout supporting the rear wheel, and a battery. According to purpose, the electric bicycle also can contain a front wheel. The electric motor with the first connector unit is fixedly connected i.e., rigidly fixed to the rear wheel and the second connector unit is fixedly connected i.e., rigidly fixed to the dropout. The electric motor is electrically connected to the battery via the first connector unit and the second connector unit. Advantageously, the second connector unit can contain a carrier which surrounds the second connecting part and the second motor connector at least in regions towards the electric motor. The carrier can be fixedly connected i.e., rigidly fixed to the dropout. In order to avoid repetition, reference is made here to the above explanations.

Further important features and advantages of the invention are apparent from the subclaims, from the drawings, and from the accompanying figure description based on the drawings.

It is understood that the above features and those to be explained below can be used not only in the combination indicated in each case, but also in other combinations or on their own, without departing from the scope of the present invention.

BRIEF DESCRIPTION OF THE DRAWINGS

Preferred embodiments of the invention are shown in the drawings and will be explained in more detail in the following description, wherein identical reference signs refer to identical or similar or functionally identical components.

It shows, in each case schematically

DETAILED DESCRIPTION

Figure 1:
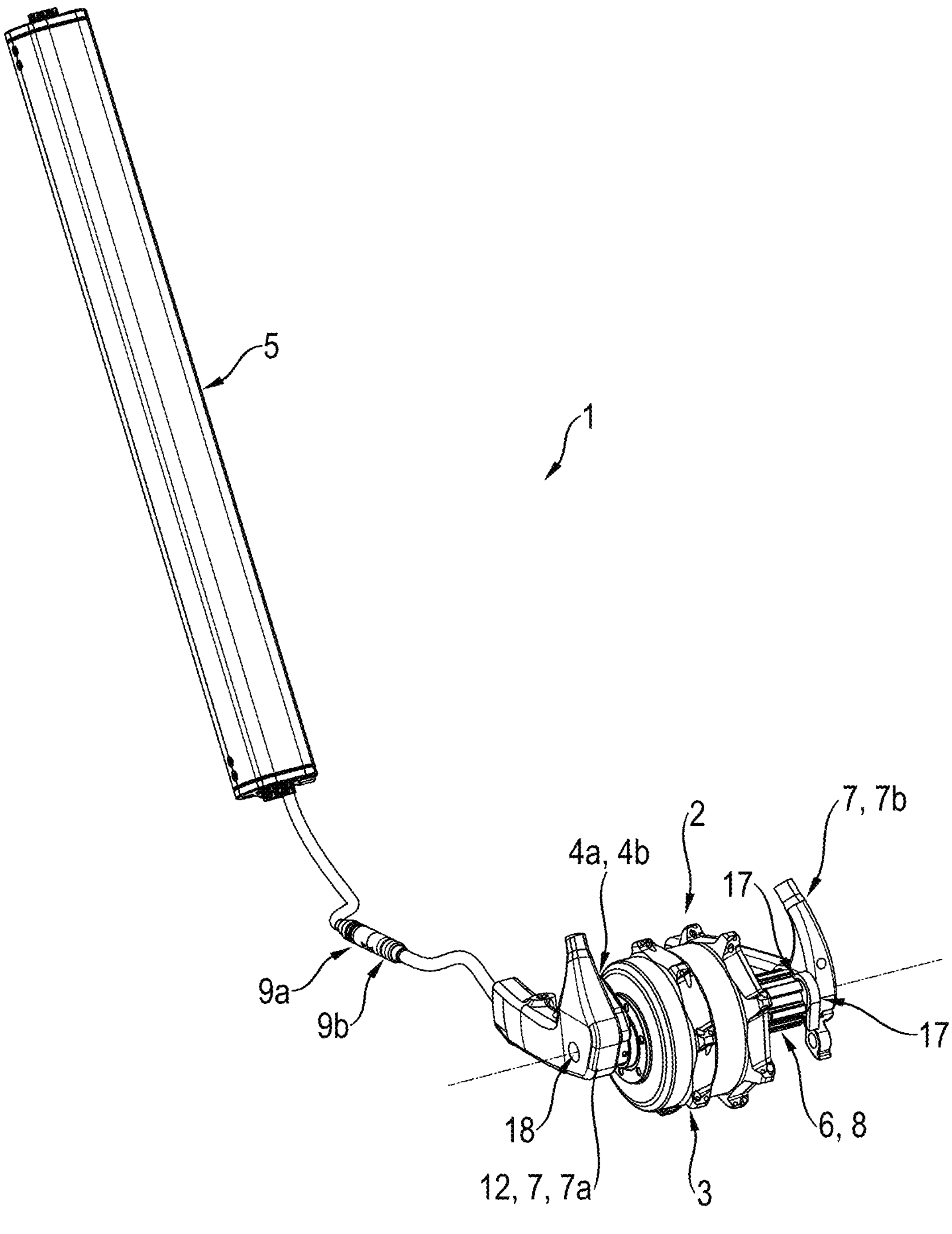
FIG. 1 a partial view of an electric bicycle according to the invention with a motor device according to the invention.

FIG. 1 shows a partial view of an electric bicycle 1 according to the invention. The electric bicycle 1 contains a motor device 2 with a motor 3 and with a first connector unit **4*a* and a second connector unit 4*b*, and further contains a battery 5, a rear wheel 6 and a dropout 7. It will be understood that the electric bicycle 1 also contains other components which are not shown here for clarity. The electric motor 3 provides an axis of rotation RA in the motor device 2. The electric motor 3 is fixedly connected i.e., rigidly fixed to the rear wheel 6 i.e., a hub 8 of the rear wheel 6 is formed by the electric motor 3. The rear wheel 6 and/or the electric motor 3 i.e., a rotor of the electric motor 3 is rotatably connected to the dropout 7, and the second connector unit 4***b* is attached i.e., fixedly connected i.e., rigidly fixed to a first dropout half 7*a* of the dropout 7. The first connector unit 4*a* is fixedly connected i.e., rigidly fixed to the electric motor 3. The battery 5 is arranged in the electric bicycle 1 spaced apart from the rear wheel 6 and from the motor device 2.

The battery 5 is electrically connected to the electric motor 3 via the second connector unit 4*b*. The battery 5 contains a first battery connector 9*a* and the second connector unit 4*b* contains a second battery connector 9*b*. To establish and release an electrical conductive connection between the battery 5 and the second connector unit 4*b*, a plug connection is established and released between the two battery connectors 9*a* and 9*b*. Further details of the structure of the motor device 2, the first connector unit 4*a*, and the second connector unit 4*b* will be explained in more detail below with reference to FIG. 2 and FIG. 3.

Figure 2:
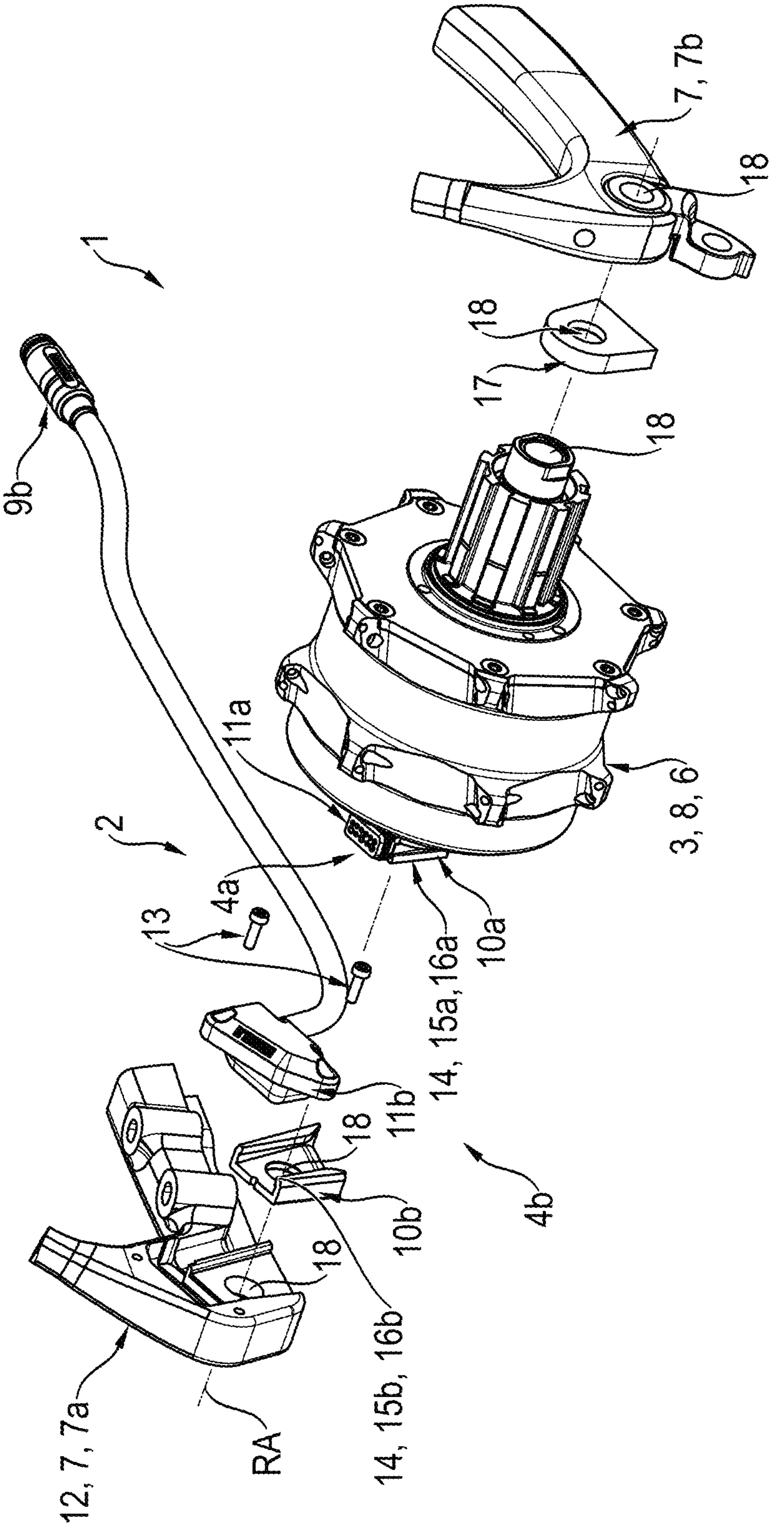
FIGS. 2 and 3 partial exploded views of the electric bicycle with the motor device according to the invention.
Figure 3:
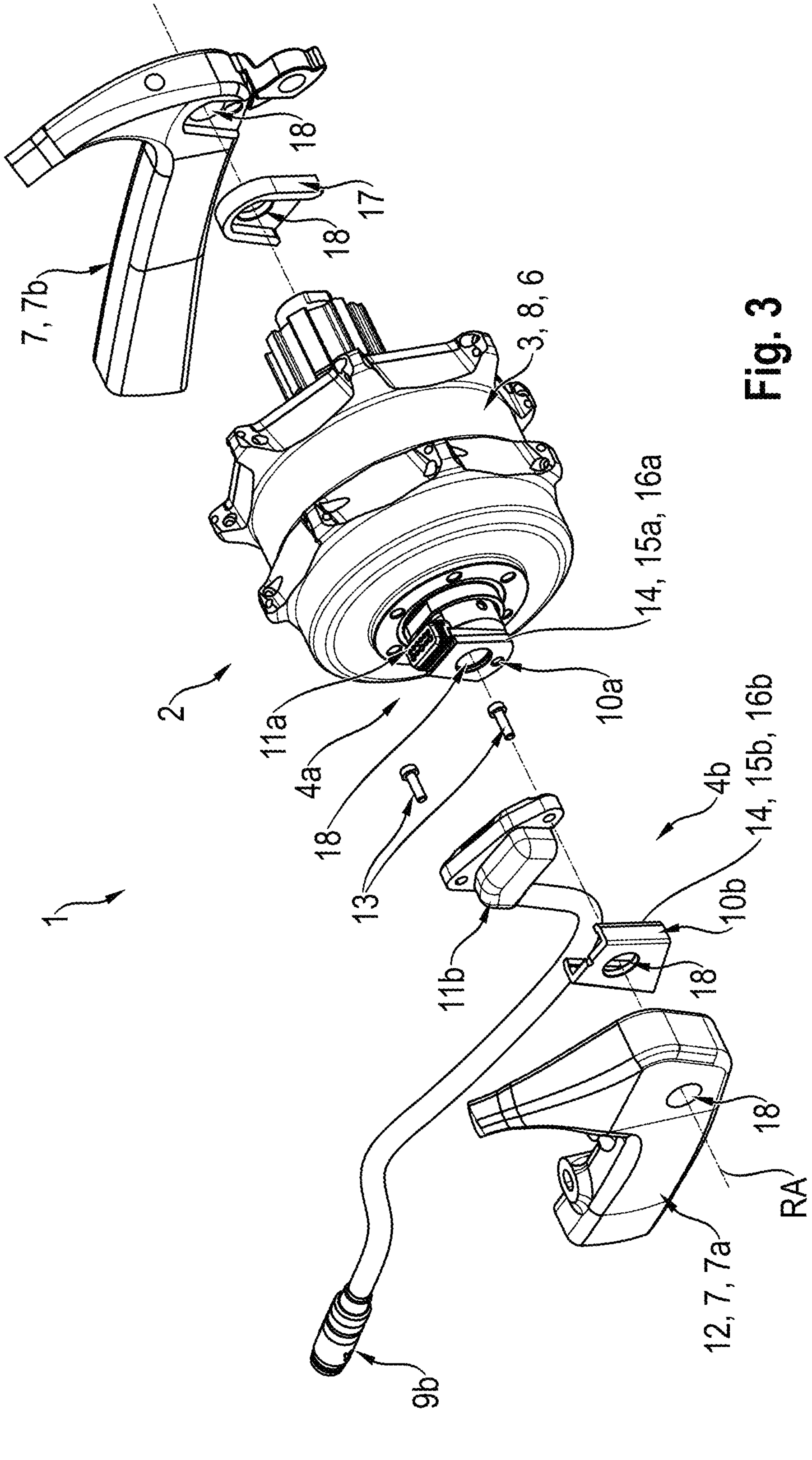

FIG. 2 and FIG. 3 show partial exploded views of the electric bicycle 1 according to the invention with the motor device 2 according to the invention. As can be seen here, the first connector unit 4*a* mounted on electric motor 3 comprises a first connecting part 10*a* and a first motor connector 11*a*. In this regard, the first connecting part 10*a* surrounds and protects the first motor connector 11*a*. The first connecting part 10*a* and the first motor connector 11*a* are rigidly fixed to each other and to the electric motor 3 i.e., the stator of the electric motor 3. The motor connector 11*a* is further electrically conductively connected i.e., electrically conductively contacted i.e., wired to a control board or a PCB (PCB: Printed Circuit Board) of the electric motor 3.

The second connector unit 4*b* comprises a carrier 12, a second connecting part 10*b* and a second motor connector 11*b*. In this regard, the carrier 12 is integrally formed with a first dropout half 7*a* of the dropout 7 i.e., is formed by the first dropout half 7*a* of the dropout 7. The second connecting part 10*b* is fixedly connected i.e., rigidly fixed to the carrier 12, and the second motor connector 11*b* is screwed and, in this way, rigidly fixed to the carrier 12 by means of two screws 13. In this way, the second connecting part 10*b* and the second motor connector 11*b* are fixedly connected i.e., rigidly fixed to each other and to the carrier 12. The motor connectors 11*a* and 11*b* are engageable with each other, whereby an electrical conductive connection can be established between the first connector unit 4*a* mounted on the electric motor 3 and the second connector unit 4*b*. When the second connector unit 4*b* is electrically conductively connected to the battery 5 via the battery connector 9*b*, the electric motor 3 is thereby electrically conductively connected to the battery 5.

Figure 8:
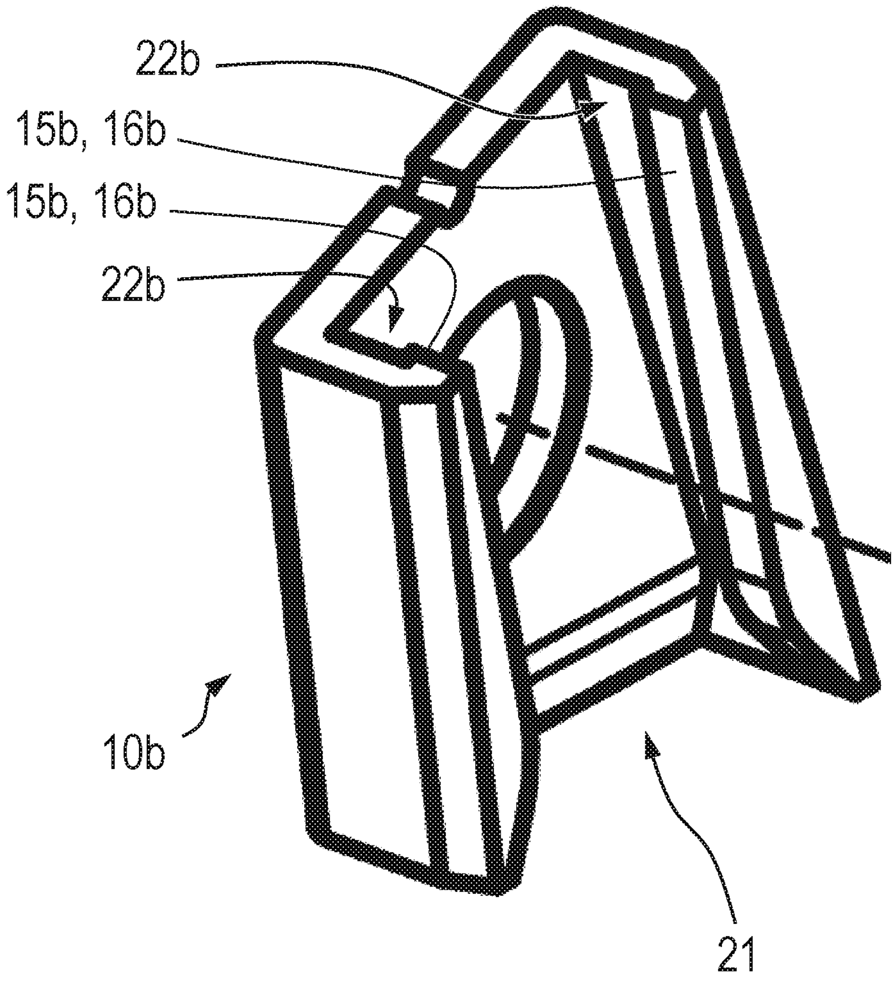
FIG. 8 is a close-up view of the second connecting part depicted in FIG. 2.

The motor device 2 further comprises a form-fitting unit 14 having a first form-fitting element 15*a* and having a second form-fitting element 15*b*. The first form-fitting element 15*a* is formed by two guide rails 16*a*, and the second form-fitting element 15*b* is formed by two guide rails 16*b*. The two guide rails 16*a* and 16*b* are spaced apart from each other and are aligned transversely to the axis of rotation RA. Moreover, the two guide rails 16*a* and 16*b* respectively approach radially inwardly. The first guide rails 16*a* and the second guide rails 16*b* can be displaceable into one another (e.g., via the first slots 22*a* and/or the second slots 22*b*) transversely to the axis of rotation RA and fixedly connectable to one another parallel to the axis of rotation RA. By means of the form-fitting unit 14, the first connecting part 10*a* and thereby the electric motor 3 can be guided in the second connecting part 10*b* (e.g., via the channel 21 shown in FIG. 8) and thereby on the second connector unit 4*b* transversely to the axis of rotation RA. Thereby, the guide rails 16*a* and 16*b* axially engage with each other and a form-fitted connection can be established and released between the first connector unit 4*a* mounted on the electric motor 3 and the second connector unit 4 mounted on the dropout 7 of the electric bicycle 1.

The motor connectors 11*a* and 11*b* are thereby arranged on the connecting parts 10*a* and 10*b* in such a way that, when the form-fitted connection between the connecting parts 10*a* and 10*b* is established and released, the electrical conductive connection between the motor connectors 11*a* and 11*b* can also be established and released. As a result, the electric motor 3 can be mounted on the second connector unit 4*b* i.e., on the dropout 7 i.e., on the electric bicycle 1 via the first connector unit 4*a* in a simplified manner.

In FIG. 2 and FIG. 3, a second dropout half 7*b* of the dropout 7 and a left hander 17 can also be seen. Furthermore, a through opening 18 in the motor device 2 and in the dropout 7 can be seen, through which a thru axle of the rear wheel 6—not shown here—can be guided.

Figure 4:
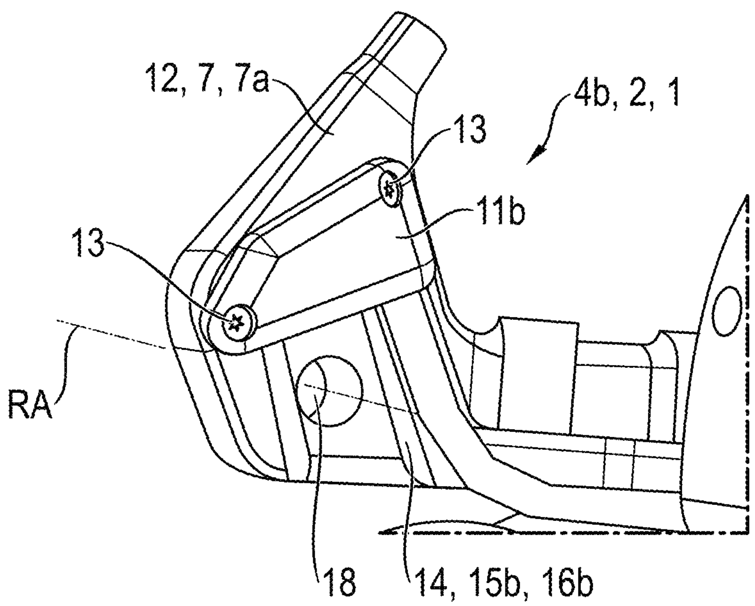
FIG. 4 a view of a connector unit for the motor device according to the invention.

FIG. 4 shows a view of the second connector unit 4*b* for the motor device 2 according to the invention. Here, the motor connector 11*b* is fixedly mounted on the carrier 12 via the screws 13.

Figure 5:
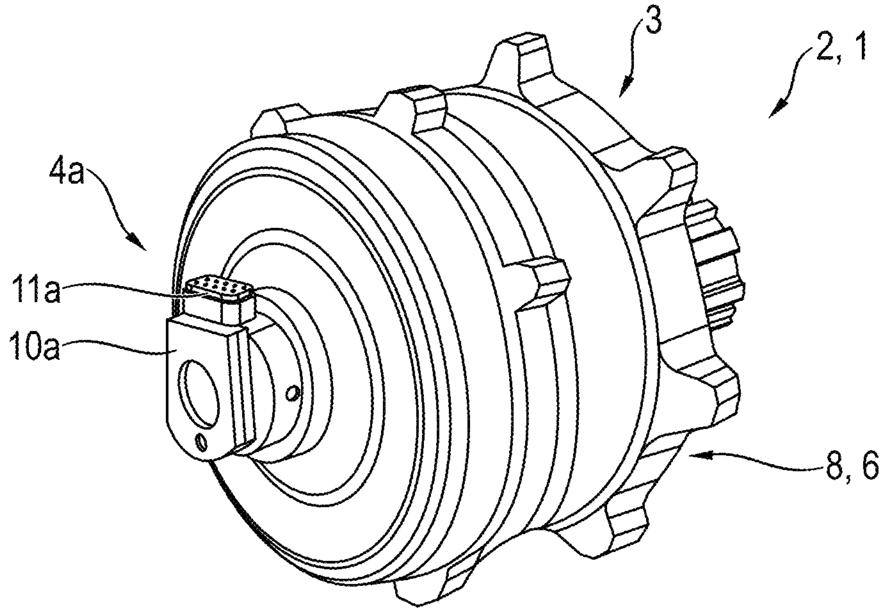
FIG. 5 a view of a motor of the motor device according to the invention.

FIG. 5 shows a view of the electric motor 3 and the first connector unit 4*a* of the motor device 2 according to the invention. In FIG. 5, it can be seen well that the first connecting part 10*a* outwardly surrounds the motor connector 11*a* in regions and thereby protects it.

Figure 6:
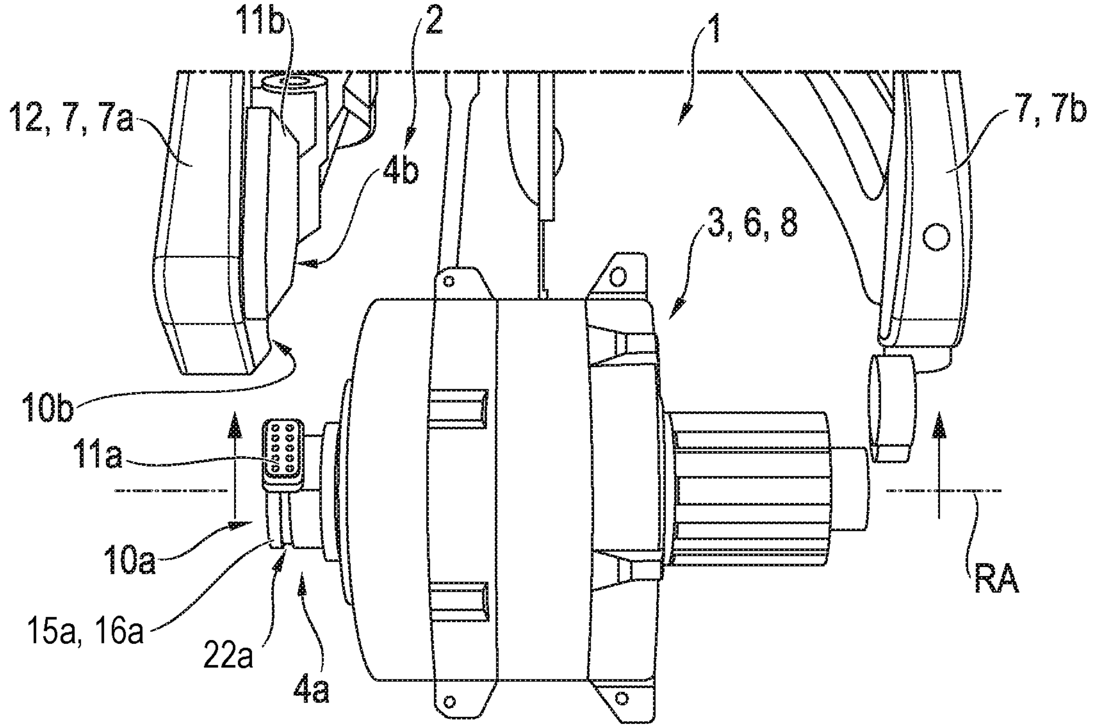
FIG. 6 a partial view of the electric bicycle according to the invention with a dismounted motor of the motor device.

FIG. 6 shows a partial view of the electric bicycle 1 according to the invention with the electric motor 3 dismounted from the dropout 7. Here, if the electric motor 3 i.e., the rear wheel 6 with the integrated motor 3 is pushed in the direction of the arrows, the first connecting part 10*a* of the first connector unit 4*a* is guided on the second connecting part 10*b* of the second connector unit 4*b* in the direction of the arrows and the form-fitted connection between the first connector unit 4*a* mounted on the electric motor 3 and the second connector unit 4*b* mounted on the dropout 7 is established. At the same time, the motor connectors 11*a* and 11*b* are engaged with each other, thereby establishing the electrical conductive connection between the electric motor 3 and the second connector unit 4*b* via the first connector unit 4*a*.

Figure 7:
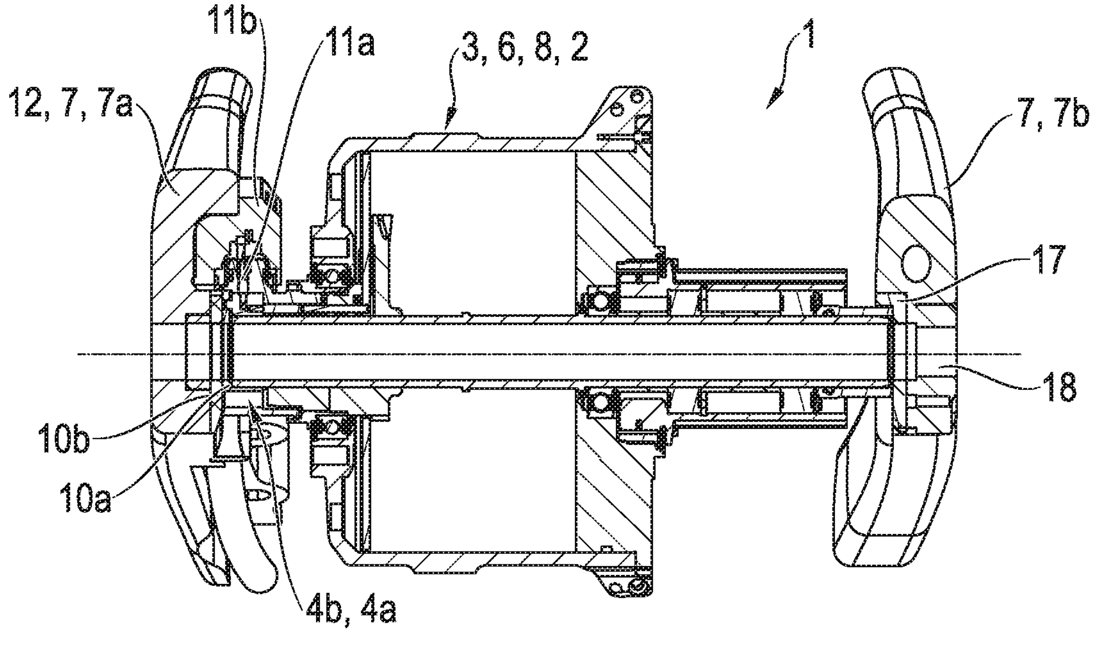
FIG. 7 a partial sectional view of the electric bicycle according to the invention with the motor device according to the invention.

FIG. 7 shows a partial sectional view of the electric bicycle 1 according to the invention with the motor device 2 according to the invention. Here, the electric motor 3 is mounted on the dropout 7 and the form-fitted and electrical conductive connection between the first connector unit 4*a* mounted on the electric motor 3 and the second connector unit 4*b* mounted on the dropout 7 is already established. Furthermore, in FIG. 7, the through-opening 18 for passing the thru axle of the rear wheel 6—not shown here—can be seen particularly well. The axis of rotation RA of the electric motor 3 is defined or predetermined by the thru axle of the rear wheel 6.

The invention claimed is:

1. A motor device for an electric bicycle, comprising:
an electric motor having an axis of rotation;
a first connector unit having a first motor connector and a first connecting part which surrounds the first motor connector regionally and outwardly, wherein the first connector unit is mounted on the electric motor and is electrically conductively connected to the electric motor via the first motor connector;

a second connector unit having a second motor connector and a second connecting part, wherein an electrical conductive connection can be established and released directly between the first motor connector and the second motor connector;

a first form-fitting element and a second form-fitting element;

wherein between the first connecting part and the second connecting part a form-fitted connection transversely to the axis of rotation can be established and released, and wherein, when the form-fitted connection between the connecting parts is established and released, the electrical conductive connection between the motor connectors can be established and released;

wherein the second connector unit is mountable on a dropout of the electric bicycle;

wherein the first form-fitting element is formed on the first connecting part and the second form-fitting element is formed on the second connecting part;

wherein the first or second form-fitting element is insertable into the second or first form-fitting element transversely to the axis of rotation to establish the form-fitted connection and restrict relative movement between the first connecting part and the second connecting part in a direction toward the electric motor;

wherein the first form-fitting element is formed by two first guide rails protruding from the first connecting part transversely to the axis of rotation, the two first guide rails disposed spaced apart from one another and aligned transversely to the axis of rotation;

wherein the second form-fitting element is formed by two second guide rails protruding from the second connecting part transversely to the axis of rotation, the two second guide rails disposed spaced apart from each other and aligned transversely to the axis of rotation;

wherein the first guide rails and the second guide rails are formed complementary to each other; and wherein the first guide rails and the second guide rails are displaceable into each other transversely to the axis of rotation.

2. The motor device according to claim 1, wherein the electric motor is configured to be rigidly fixed to a rear wheel of the electric bicycle.

3. The motor device according to claim 1, wherein:

the two first guide rails are aligned non-parallel to one another and approach one another radially inwards towards the axis of rotation; and the two second guide rails are aligned non-parallel to one another and approach one another radially inwards towards the axis of rotation.

4. The motor device according to claim 1, wherein the second connector unit includes a carrier which surrounds the second connecting part and the second motor connector at least in regions towards the electric motor.

5. The motor device according to claim 1, further comprising an axle through passage configured to receive a thru axle, the axle through passage defining the axis of rotation of the electric motor and extending through the electric motor, the first connecting part, and the second connecting part.

6. The motor device according to claim 1, wherein:

the second connector unit contains a second battery connector for connecting the second connector unit to a first battery connector of a battery of the electric bicycle; and the second battery connector is electrically conductively connected to the second motor connector via a cable.

7. The motor device according to claim 6, wherein the second battery connector is connectable to the first battery connector via a plug connection.

8. A connector unit arrangement for the motor device of claim 1, the connector unit arrangement comprising:

the first connector unit and the second connector unit;

wherein a form-fitted connection can be established and released between the second connector unit and the first connector unit via displacement of the first connector unit and/or the second connector unit in a direction transverse to the axis of rotation; and wherein, when the form-fitted connection is produced and released, an electrical conductive connection can be established and released between the second connector unit and the first connector unit for the electric motor.

9. An electric bicycle, comprising:

the motor device of claim 1;

a rear wheel;

a dropout supporting the rear wheel; and a battery;

wherein the electric motor with the first connector unit is fixed to the rear wheel and the second connector unit is fixed to the dropout; and wherein the electric motor is electrically conductively connected to the battery via the second connector unit.

10. The motor device according to claim 1, wherein the first connecting part is a protective cover extending partially around and protecting the first motor connector.

11. The motor device according to claim 1, wherein the first motor connector and the second motor connector are pluggable into one another and unpluggable from one another to establish and release the electrical conductive connection therebetween.

12. The motor device according to claim 1, wherein at least a portion of the first motor connector projects from the first connecting part and is disposed at least partially within the second motor connector when the first connecting part and the second connecting part are connected.

13. The motor device according to claim 1, wherein the first connecting part is arranged on an axial end of a housing of the electric motor.

* * * * *